US008650705B2

(12) United States Patent
Hunnekuhl et al.

(10) Patent No.: US 8,650,705 B2
(45) Date of Patent: Feb. 18, 2014

(54) FLOOR-TYPE VACUUM CLEANER HAVING A HOUSING WHICH IS DISPLACEABLE ON ROLLERS

(75) Inventors: Christian Hunnekuhl, Osnabrueck (DE); Volker Gerth, Bielefeld (DE)

(73) Assignee: Miele & Cie. KG, Guetersloh (DE)

( * ) Notice: Subject to any disclaimer, the term of this patent is extended or adjusted under 35 U.S.C. 154(b) by 276 days.

(21) Appl. No.: 13/184,586

(22) Filed: Jul. 18, 2011

(65) Prior Publication Data

US 2012/0017391 A1    Jan. 26, 2012

(30) Foreign Application Priority Data

Jul. 20, 2010    (EP) .................................. 10 401 114
Jun. 8, 2011     (EP) .................................. 11 401 529

(51) Int. Cl.
*A47L 9/00*    (2006.01)

(52) U.S. Cl.
USPC ....................................... 15/327.3; 15/327.2

(58) Field of Classification Search
USPC .................. 15/300.1, 327.2–327.4
See application file for complete search history.

(56) References Cited

U.S. PATENT DOCUMENTS

| 5,964,008 | A | * | 10/1999 | Lim ................................ 15/339 |
| 6,141,822 | A |   | 11/2000 | Riviera-Boklund et al. |
| 7,096,902 | B2 |   | 8/2006 | Bott et al. |
| 8,418,311 | B2 | * | 4/2013 | Trydegard et al. ............... 15/326 |
| 2007/0056667 | A1 | * | 3/2007 | Worwag ........................ 152/212 |

FOREIGN PATENT DOCUMENTS

| DE | 28 24 033 A1 | 12/1979 |
| DE | 3007654 A1 | 9/1981 |
| DE | 202008001142 U1 | 6/2009 |
| DE | 102008009617 A1 | 8/2009 |
| DE | 102008011542 A1 | 9/2009 |
| EP | 0187126 A2 | 7/1986 |
| GB | 909161 A | 10/1962 |
| JP | 3251220 A | 11/1991 |
| WO | WO 03001957 A1 | 1/2003 |
| WO | WO 2008041956 A2 | 4/2008 |
| WO | WO 2008082338 A1 | 7/2008 |

OTHER PUBLICATIONS

European Search Report for EP 10 40 1114, dated Sep. 2, 2011.
European Search Report for EP 11 40 1529, dated Sep. 5, 2011.
European Search Report for EP 10 40 1114, dated Jan. 3, 2011.

* cited by examiner

*Primary Examiner* — Dung V Nguyen
(74) *Attorney, Agent, or Firm* — Leydig, Voit & Mayer, Ltd.

(57) ABSTRACT

A floor-type vacuum cleaner includes a housing and rollers attached to the housing that are configured to provide movement of the housing. Each roller is disposed on a roller axle so as to be rotatable. At least one of the rollers includes a rigid hub and an air-filled, rubber, resilient, damping tire. Alternatively, at least one of the rollers has a damping property and includes alternating concentric layers of rigid and flexible components, with air being disposed between at least one of the rigid components and at least one of the flexible components.

17 Claims, 4 Drawing Sheets

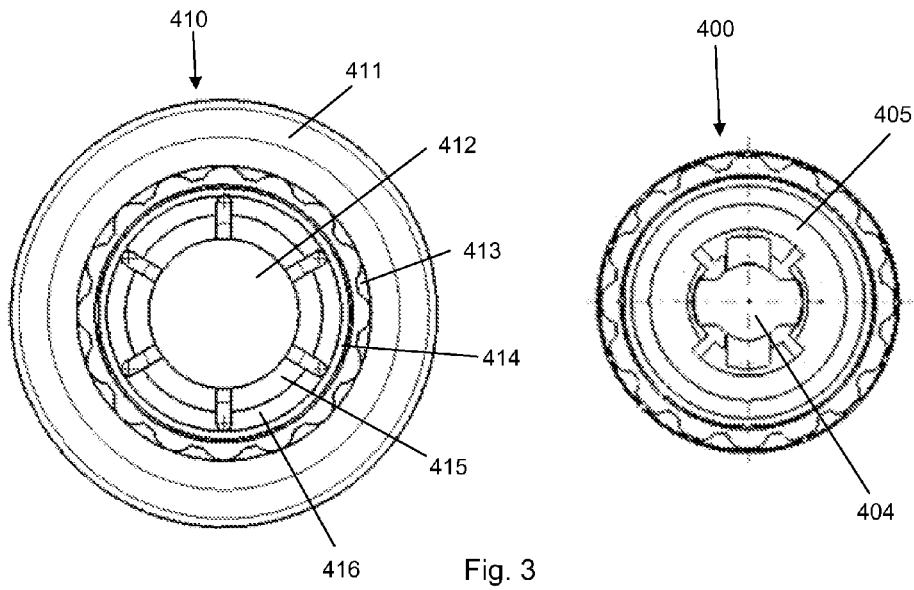
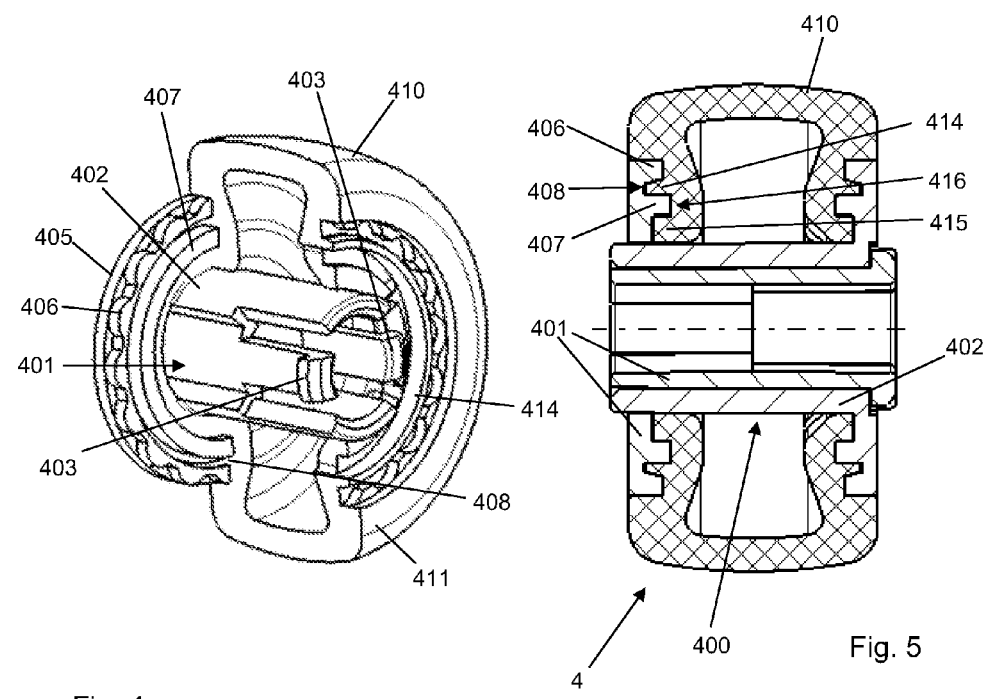
Fig. 3
Fig. 4
Fig. 5

FLOOR-TYPE VACUUM CLEANER HAVING A HOUSING WHICH IS DISPLACEABLE ON ROLLERS

CROSS REFERENCE TO RELATED APPLICATIONS

This application claims priority to European Patent Application Nos. EP 10 401 114.3 and EP 11 401 529.0, filed on Jul. 20, 2010 and Jun. 8, 2011, respectively, and which are both hereby incorporated by reference herein in their entirety.

FIELD

The invention relates to a floor-type vacuum cleaner which is formed so as to be displaceable on rollers, the rollers being mounted so as to be able to rotate on roller axles or being held on roller axles which are mounted so as to be able to rotate.

BACKGROUND

Rollers of vacuum cleaner carriages can be produced from a plastics material core and to provide this with a covering of resilient material; see for example DE-OS 28 24.033. In spite of the covering, the forces resulting from unevennesses in the floor are transferred to the housing via the rollers, and lead to sounds and material-damaging vibrations, in particular during suction operation on hard floors and when travelling over obstacles such as door sills, tile joints, or even the vacuum cleaner's own power cable. Rollers having a resilient carriage body are also described in GB 909,161 and WO 03/001957 A1.

SUMMARY

In an embodiment, the present invention provides a floor-type vacuum cleaner including a housing and rollers attached to the housing that are configured to provide movement of the housing. Each roller is disposed on a roller axle so as to be rotatable. At least one of the rollers includes a rigid hub and an air-filled, rubber, resilient, damping tire. Alternatively, at least one of the rollers includes alternating concentric layers of rigid and flexible components with air being disposed between at least one of the rigid components and at least one of the flexible components so as to provide a damping property.

BRIEF DESCRIPTION OF THE DRAWINGS

Embodiments of the invention are described in more detail below and shown schematically in the drawings, in which:

FIG. 3 is a side view of a tire and a hub in a further embodiment of a roller, FIG. 4 is a partial section through a perspective view of the roller according to FIG. 3, FIG. 5 is a longitudinal section in the region of the roller axle through the roller according to FIG. 3.

DETAILED DESCRIPTION

Figure 1:
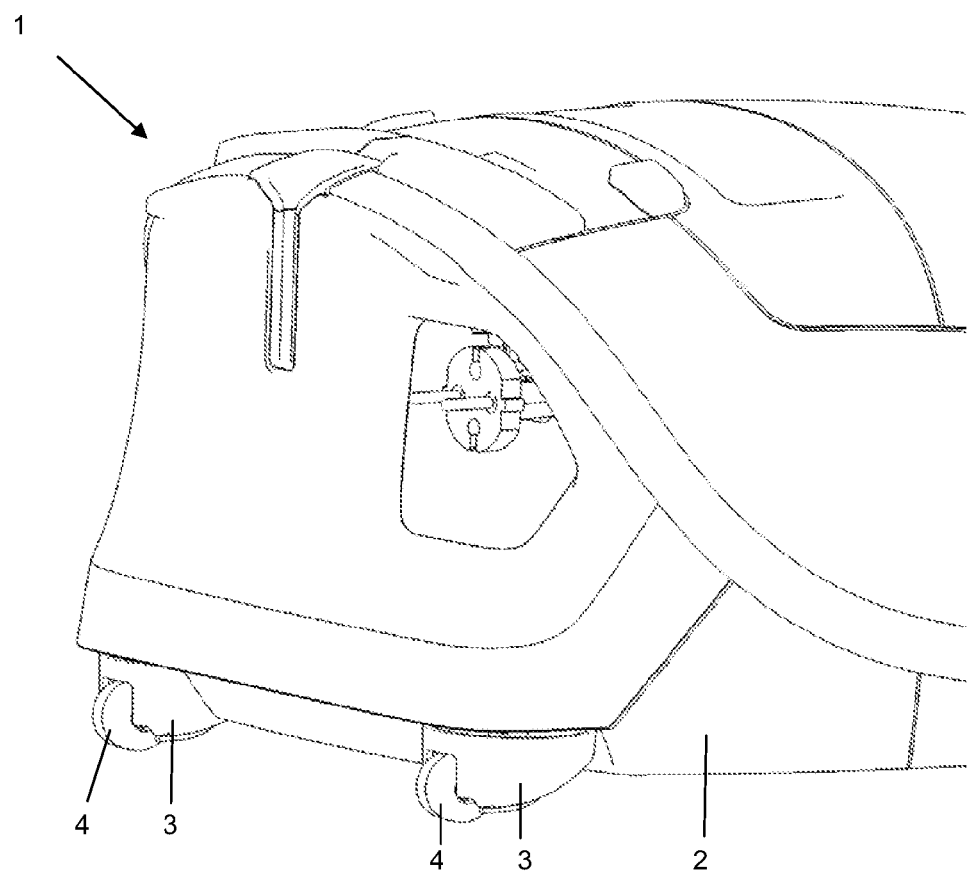
FIG. 1 shows the rear region of a floor-type vacuum cleaner.

In an embodiment, the present invention provides better damping of travel sounds and vibrations due to travel in a floor-type vacuum cleaner.

The advantages which can be achieved with embodiments of the invention are provided in that at least one of the rollers comprises a rigid hub and a damping tire, and in that the resilient tire is formed as an air-filled rubber tire. On the one hand, this achieves effective sound damping when the vacuum cleaner travels, and on the other hand, the transfer of sounds from the vacuum cleaner fan to the floor and a build-up of resonance linked thereto are prevented. Moreover, vibrations resulting from floor unevennesses during travel are transferred to the housing in a damped manner.

For simple mounting, it is expedient if the hub comprises at the ends thereof radial collars which receive the tires in a positive fit.

Travelling over door sills and other obstacles can lead to relative movement of the hub and the tire. To avoid this, it is advantageous if antitwist protection is arranged between the hub and the tire. This can be provided in that at least one collar and at least one radially orientated flank of the tire have toothings which engage in one another. This provides a positive connection between the hub and the tire. The toothings may be arranged at least on a reference circle, and fully circumferential toothings are advantageous. It is further advantageous if grooves and/or webs are arranged on the collar and the flank, and hold the collar and the flank in the meshed position. Most simply, the grooves and/or webs may be arranged concentrically with the toothings.

The assembly is also facilitated in that the hub consists of two parts, each of which comprises a collar. The two parts may be formed identically to avoid confusion. Most simply, they are connected by a catch which can be locked by inserting a roller axle into the hub.

It is moreover particularly advantageous if at least one roller axle is mounted in a manner damped with respect to the housing. In particular, if the roller axle is received by a runner mounted so as to be able to rotate on the housing, a runner axle should be associated with a damping member. On the one hand, this damps the vibrations and oscillations on the wheel-housing path, and on the other hand, vibrations which act directly on the runner, for example during travel over tall obstacles, are not passed on directly to the housing. Damping the roller axle from the housing may also be expedient per se, i.e. without rollers which have damping properties.

Expedient configurations provide that the runner axle fixed to the housing is arranged in the runner with interposition of a receiving sleeve, the damping member being arranged between the receiving sleeve and the runner, or that the runner axle fixed to the housing is arranged in the runner with interposition of the damping member. In both cases, it is advantageous if the receiving sleeve or the runner axle is received in the runner with axial play. This results in the damping member having an ideal effect.

Alternatively, the roller may comprise concentric layers of alternating rigid and flexible components. In this case, it is advantageous if inclusions of air are arranged between at least one rigid component and at least one flexible component. This also provides good damping of vibrations and oscillations. It is then expedient if the running surface of the roller is formed as a flexible component.

FIG. 1 is a perspective view of the rear region of a floor-type vacuum cleaner 1. From this it can be seen that two runners 3 having rollers 4 are arranged on a lower housing part 2 in the rear region. A further runner, likewise provided with a roller, is arranged in the front region.

The runners 3 are mounted so as to be able to rotate on the lower housing part 2 about an axle which is vertical in the use position of the floor-type vacuum cleaner. For this purpose, three runner axles 5 are fixed to the lower housing part 2 (see FIG. 7). The arrangement of the runner axles 5 within the runners is described further below.

The rollers 4 are likewise mounted so as to be able to rotate. In this case, mounting is on a roller axle 6 which is horizontal in the use position (see FIG. 2) and which is fixed by the ends 61 and 62 thereof in the runner 3. The horizontal rotational mounting of the roller axles 6 makes the transport movement of the floor-type vacuum cleaner 1 possible and the vertical rotational mounting of the runner axles 5 makes a steering movement possible.

Figure 2:
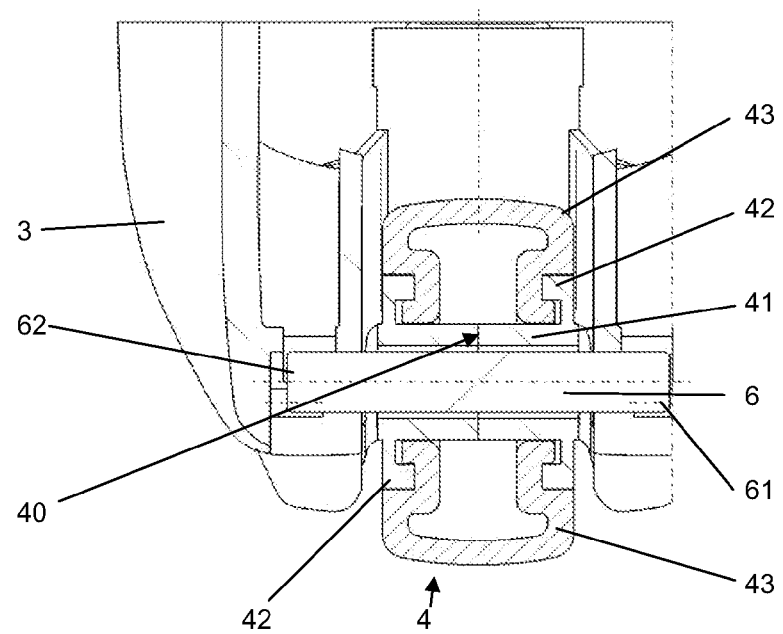
FIG. 2 is a section through a runner having a roller in the region of the roller axle.

FIG. 2 is a section through a first embodiment of a roller 4 in the runner 3, splitting the roller in the region of the roller axle 6. It can be seen that the roller 4 has a hub 40 of which a sleeve-shaped portion 41 surrounds the axle 6. Respective radially orientated and subsequently inwardly angled collars 42 are attached to the ends of the sleeve-shaped portion 41. The entire hub 40 is manufactured from a rigid plastics material such as PE (polyethylene) and constructed in two parts. The two halves of the hub can be connecting by suitable means such as welding, adhesion or locking. The collar holds a hollow tire 43 made of an elastomeric material such as EPDM (ethylene propylene diene monomer rubber) in a positive fit. This results in an air-filled rubber tire which has a damping property. The damping effect can be adjusted by way of the properties of the elastomer mixture. Further, the roller diameter has been expanded by comparison with the known runner rollers. This facilitates travel over relatively large obstacles such as the power cable of the floor-type vacuum cleaner 1, since the angle of the tangent between the roller 4 and the obstacle from the horizontal is reduced and consequently the pull required to raise the floor-type vacuum cleaner 1 is smaller.

With the embodiment of the roller 4 according to FIG. 2, travelling over door sills and other obstacles can lead to a relative movement of the hub 40 and tire 43. On the one hand, this leads to wear, and on the other hand, the tire 43 is flexed and stretches. The tire 43 is then released from the hub 40 and the wear increases. The play arising between the components can then lead to lateral deflection of the tire 43, in such a way that the wheel no longer rotates when the floor-type vacuum cleaner 1 is manoeuvred. FIGS. 3 to 5 show an embodiment of a roller 4 in which relative movement of the hub 400 and tire 401 is prevented. FIG. 3 shows the hub 400 and tire 410 of a roller of this type. It can be seen that one flank 411 of the tire 410 has a circumferential toothing 413 concentric with the opening 412. Two webs 414 and 415 are formed concentric with the toothing 413 and closer to the opening 412, from the EPDM material, and enclose a groove 416 between them. FIG. 4 is a section of a tire into the opening of which a first hub part 401 has been inserted. The part 401 comprises a sleeve-shaped portion 402 having two catch hooks 403. A collar 405 is integrally formed on the end opposite the catch hooks 403, and has, on the inside, a circumferential toothing 406 which engages in the toothing 413 of the tire 410 and forms antitwist protection. A circumferential web 407 is integrally formed concentric with the toothing 406 of the collar 405, closer to the sleeve-shaped part 402, and together with the toothing 406 forms a further groove 408. In the assembled state (see FIG. 5), this results in an alternating sequence of grooves 408, 416 and webs 407, 414, 415 between the tire 410 and the collar 400. This secures the positive fit between the two toothings 406 and 413 and prevents the tire 410 from being released from the hub 400. Moreover, the webs 414 and 415 increase the stability of the tire 410. To assemble the roller 4, the two hub parts 401 and 409 are inserted into one another, while rotated through 90° and with interposition of the tire 410, and pressed together until the catch hooks 403 push through the opening 403 of the respective other collar 405, and lock. The catch connection is initially still releasable, but is secured by inserting the roller axle 6. FIG. 5 shows the roller 4 in the assembled state.

Figure 6:
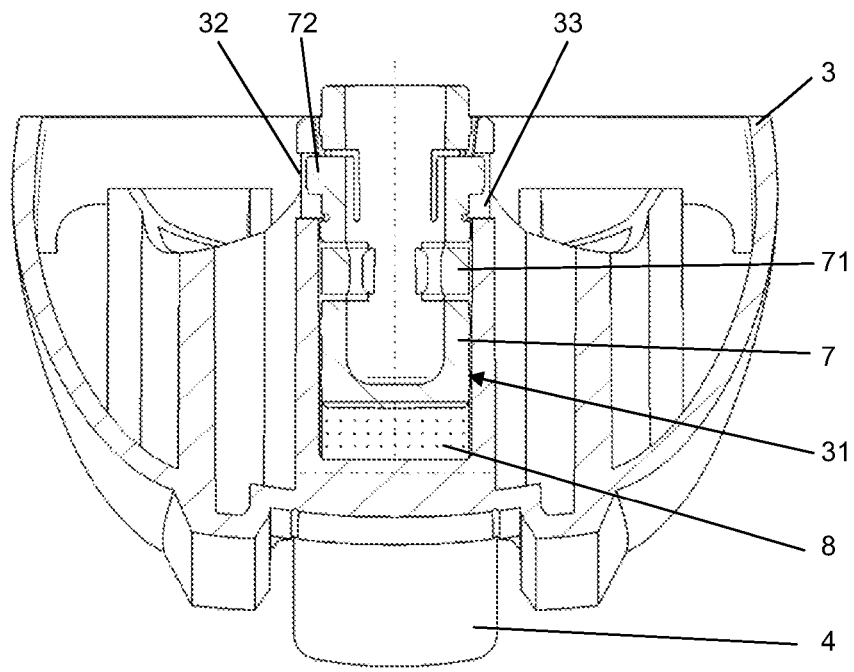
FIG. 6 is a longitudinal section through a first embodiment of a runner in the region of the runner axle.
Figure 7:
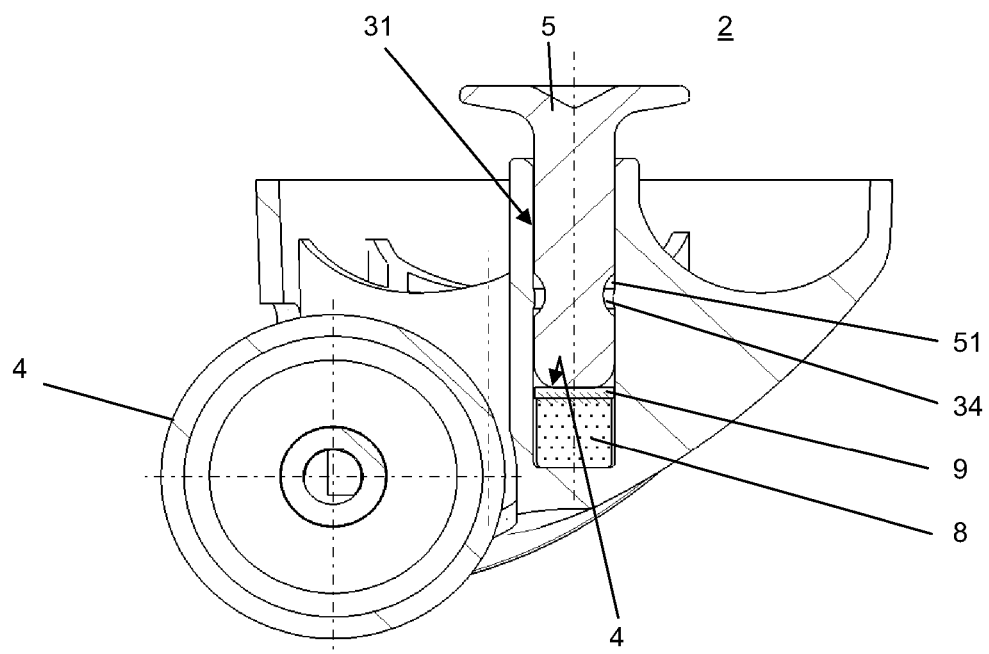
FIG. 7 is a section through a second embodiment of a runner in the region of the runner axle.

In addition to the damping roller itself, the runner 3 and thus the roller axle 6 are also mounted so as to be damped with respect to the lower housing part 2. This means that impacts on the runner 3 are also not transferred undamped to the lower housing part 2. FIG. 6 shows a first embodiment of damping of this type. The runner axle 5 fixed to the lower housing part 2 (as shown in FIG. 7) locks rotatably in a receiving sleeve 7. For this purpose, two resilient projections 71 on the sleeve 7 engage in a groove 51 on the axle 5. The receiving sleeve 7 is then slid into a hole 31 in the runner 3, in which a platelet-shaped damping member 8 has previously been laid. The damping member 8 consists of polyurethane. The receiving sleeve 7 is likewise fixed in the runner 3 via a catch (catch projections 72 and groove 32), but in this case there is sufficient axial play 33 for the sleeve 7 to be able to compress the damping member 8 and for the force transfer between the runner 3 and the lower housing part 2 to be damped.

FIG. 7 shows a further possibility for damping the runner axle 5 from the lower housing part 2. In this case, the runner 3 is formed in one piece and the runner axle 5 locks directly in the hole 31. Accordingly, catch projections 34 are arranged directly on the wall of the hole 31 and engage in the groove 51. The groove 51 is wider than the catch projections 34, and so there is axial play in this case too. A damping ember 8 in the form of a polyurethane panel is initially laid in the hole 31, followed by a thin panel 9 of a highly wear-resistant, self-lubricating polymer such as UHMW PE (ultra-high-molecular-weight polyethylene). The polyurethane panel 8 damps the play-based movements of the runner axle 5, and the polymer panel 9 prevents the end face 52 of the axle 5 from rubbing against the polyurethane 8 during rotations.

Figure 8:
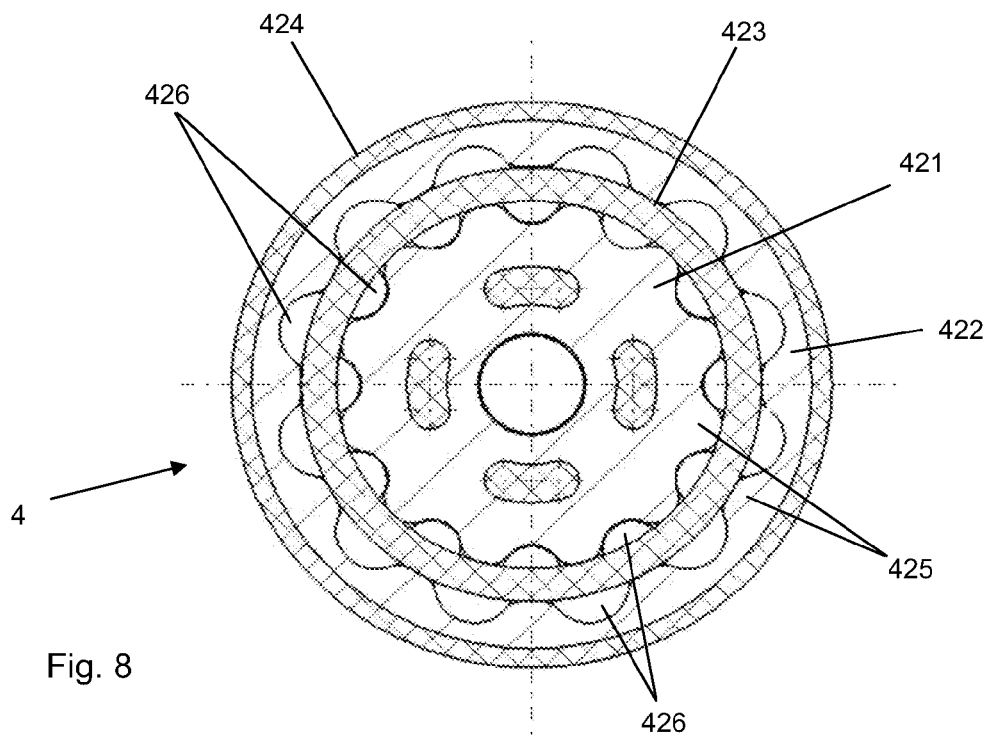
FIG. 8 is a section through a further embodiment of a roller.
Figure 9:
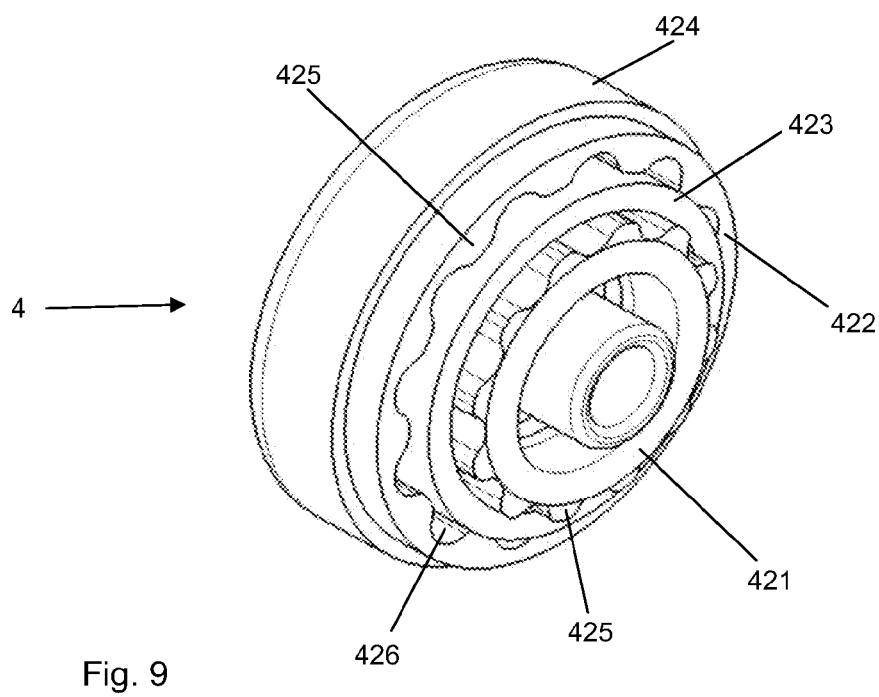
FIG. 9 is a perspective view of the roller according to FIG. 8.

FIGS. 8 and 9 show a further embodiment of a roller 4, which likewise has a damping property and is configured in such a way (see FIG. 9) that the inner region 421 which receives the roller axle 6 consists of a rigid component such as PE. A further region 422 which concentrically surrounds the inner region 421 is likewise made from the rigid component. Flexible component rings 423 and 424 are used both between the rigid component regions 421 and 422 and also as the running surface of the roller 4. An injection-moudable thermoplastic elastomer having good rolling properties, such as TPU (thermoplastic polyurethane) is preferably used in this context. An advantage of a roller 4 of this type is that it can be produced in one piece in a two-component injection moulding process. The rigid component regions 421 and 422 are each toothed towards the flexible component in both parts. These teeth 425 are aligned offset from one another, in such a way that they engage in one another (see section in FIG. 8). The inner flexible component ring 423 is thus arranged between the teeth 425 of the rigid component regions 421 and 422. The space between the teeth is left clear and comprises air inclusions 426 into which the ring 423 can expand. When a force is transferred from the runner 3 to the roller axle 6, the inner rigid component region 421 resiles against the flexible component ring 423. The teeth 425 of the inner rigid component region 421 thus press the flexible components 423 into the free region 426 between the teeth 425 of the outer rigid component region 422. The toothing 425 on the two rigid component regions 421 and 422 is advantageous, since in this way quiet operation is possible. The teeth 425 engage in one another with the flexible components 423 in the manner of gear wheels. The outer flexible component ring 424 makes quiet operation possible on hard floors, and additionally provides damping.

While the invention has been particularly shown and described with reference to preferred embodiments thereof, it will be understood by those skilled in the art that various changes in form and details may be made therein without departing from the spirit and scope of the invention.

What is claimed is:

1. A floor-type vacuum cleaner comprising:
   a housing; and
   rollers attached to the housing and configured to provide movement of the housing, each roller being disposed on a roller axle so as to be rotatable, at least one of the rollers including a rigid hub and an air-filled, rubber, resilient, damping tire,
   wherein the hub includes ends having radial collars, the radial collars of the hub receiving the tire in a positive fit, and
   wherein the at least one of the rollers includes antitwist protection disposed between the hub and the tire.

2. The floor-type vacuum cleaner recited in claim 1, wherein rotation of each of the rollers is provided by at least one of:
   the roller being rotatably disposed on the respective roller axle, and
   the respective roller axle being rotatable.

3. The floor-type vacuum cleaner recited in claim 1, wherein the tire includes at least one radially orientated flank having toothings, wherein at least one of the radial collars includes corresponding toothings, and wherein the respective toothings engage each other so as to provide the antitwist protection.

4. The floor-type vacuum cleaner recited in claim 3, wherein the toothings are disposed at least on a reference circle.

5. The floor-type vacuum cleaner recited in claim 4, wherein the at least one radial collar and the at least one flank each includes at least one of grooves and webs holding the at least one radial collar and at least one flank in a meshed position.

6. The floor-type vacuum cleaner recited in claim 5, wherein the at least one of grooves and webs are disposed concentrically with the toothings.

7. A floor-type vacuum cleaner comprising:
   a housing; and
   rollers attached to the housing and configured to provide movement of the housing, each roller being disposed on a roller axle so as to be rotatable, at least one of the rollers including a rigid hub and an air-filled rubber, resilient, damping tire,
   wherein the hub includes first and second parts each including one of the radial collars.

8. The floor-type vacuum cleaner recited in claim 7, wherein the first and second parts are identical.

9. The floor-type vacuum cleaner recited in claim 8, wherein the first part is lockable with the collar of the second part, and the second part is lockable with the collar of the first part.

10. The floor-type vacuum cleaner recited in claim 9, wherein the respective parts include a catch for locking the first and second parts, and wherein the catch is configured so as to lock upon insertion of the respective roller axle into the hub.

11. A floor-type vacuum cleaner claim 1, comprising:
    a housing; and
    rollers attached to the housing and configured to provide movement of the housing, each roller being disposed on a roller axle so as to be rotatable, at least one of the rollers including a rigid hub and an air-filled, rubber, resilient, damping tire,
    wherein at least one of the roller axles is attached to the housing in a damped manner.

12. The floor-type vacuum cleaner recited in claim 11, wherein the at least one roller axle is received by a runner that is rotatably connected to the housing, the runner including a runner axle associated with a damping member.

13. The floor-type vacuum cleaner recited in claim 12, wherein the runner axle is attached to the housing through a receiving sleeve disposed between the runner axle and the runner, and wherein the damping member is disposed between the receiving sleeve and the runner.

14. The floor-type vacuum cleaner recited in claim 12, wherein the runner axle is attached to the housing, and the damping member is disposed between the runner axle and the runner.

15. The floor-type vacuum cleaner recited in claim 13, wherein at least one of the runner axle and the receiving sleeve is axially movable in the runner.

16. The floor-type vacuum cleaner recited in claim 14, wherein the runner axle is axially movable in the runner.

17. A floor-type vacuum cleaner comprising:
    a housing; and
    rollers attached to the housing and configured to provide movement of the housing, each roller being disposed on a roller axle so as to be rotatable, at least one of the rollers including alternating concentric layers of rigid and flexible components with air being disposed between at least one of the rigid components and at least one of the flexible components so as to provide a damping property,
    wherein a first of the flexible components forms a running surface of the roller.

* * * * *